United States Patent
Xia et al.

(10) Patent No.: US 12,116,455 B2
(45) Date of Patent: Oct. 15, 2024

(54) PREPARATION OF ALKYLCYCLOHEXANOL POLYOXYETHYLENE ETHER EMULSIFIER AND APPLICATION THEREOF

(71) Applicant: Jiangnan University, Wuxi (CN)

(72) Inventors: Yongmei Xia, Wuxi (CN); Yun Fang, Wuxi (CN); Xueyi Hu, Wuxi (CN); Conglin Ren, Wuxi (CN); Fei Qian, Wuxi (CN); Yitao Hu, Wuxi (CN); Xinyu Meng, Wuxi (CN)

(73) Assignee: Jiangnan University, Wuxi (CN)

( * ) Notice: Subject to any disclaimer, the term of this patent is extended or adjusted under 35 U.S.C. 154(b) by 452 days.

(21) Appl. No.: 17/113,309

(22) Filed: Dec. 7, 2020

(65) Prior Publication Data

US 2021/0087334 A1    Mar. 25, 2021

Related U.S. Application Data

(63) Continuation of application No. PCT/CN2019/111823, filed on Oct. 18, 2019.

(30) Foreign Application Priority Data

Apr. 4, 2019  (CN) .......................... 201910270939.2

(51) Int. Cl.
 *C09K 23/00*   (2022.01)
 *C08G 65/26*   (2006.01)
(52) U.S. Cl.
 CPC ..... *C08G 65/2648* (2013.01); *C08G 65/2609* (2013.01); *C09K 23/00* (2022.01)

(58) Field of Classification Search
 CPC ........................ C08G 65/2648; C08G 65/2609; C09K 23/00; C07C 41/03; C07C 2601/14
 See application file for complete search history.

(56) References Cited

U.S. PATENT DOCUMENTS 6,111,146 A * 8/2000 Rayborn ............. C08G 65/322
                                                      568/606
2003/0009061 A1 * 1/2003 Inoue ...................... C07C 41/42
                                                      568/670

FOREIGN PATENT DOCUMENTS

| CN | 1237579 A | 12/1999 |
| CN | 106946663 A | 7/2017 |
| CN | 108976105 A | 12/2018 |
| CN | 109966988 A | 7/2019 |

(Continued)

*Primary Examiner* — Alicia Bland
(74) *Attorney, Agent, or Firm* — IPRO, PLLC

(57) ABSTRACT

The disclosure discloses preparation and application of an alkylcyclohexanol polyoxyethylene ether emulsifier, and belongs to the technical field of surfactants. By performing ethylene oxide adducting on alkylcyclohexanol polyoxyethylene ether (1-3) and using a strong alkaline suspension dispersed in the solvent and alkylcyclohexanol polyoxyethylene ether (1-3) as a catalyst, nonionic surfactants alkylcyclohexanol polyoxyethylene ether (5-17) are synthesized. The products all have good characteristics of nonionic surfactants, and contain lower content of polyethylene. The products such as nonylcyclohexanol ethoxylate (7) and nonylcyclohexanol ethoxylate (9) have emulsifying properties similar to the emulsifying property of nonylphenol ethoxylate (10), and therefore can substitute for nonylphenol ethoxylate (10) as an emulsifier.

9 Claims, 3 Drawing Sheets

(56) References Cited

FOREIGN PATENT DOCUMENTS

DE           4417947 A1    11/1995
JP        2000109444 A     4/2000

\* cited by examiner

PREPARATION OF ALKYLCYCLOHEXANOL POLYOXYETHYLENE ETHER EMULSIFIER AND APPLICATION THEREOF

TECHNICAL FIELD

The disclosure relates to preparation of alkylcyclohexanol polyoxyethylene ether emulsifier and application thereof, and belongs to the field of preparation and application of nonionic surfactants.

BACKGROUND

In past 40 years, alkylphenol ethoxylates ($APEO_n$) are widely applied to industrial and domestic cleaning products due to their high efficiency and economical efficiency, with a global $APEO_n$ yearly consumption of 880 million pounds. $APEO_n$ include about 80-85% of nonylphenol ethoxylates ($NPEO_n$), 15% or higher of octylphenol ethoxylates ($OPEO_n$), 1% of dodecylphenol ethoxylates ($DPEO_n$) and 1% of dinonyl phenol ethoxylates ($DNPEO_n$). $NPEO_n$ are low in price and stable in property, have good emulsifying and wetting properties and are widely applied to all fields of textile, papermaking, household bath items and the like, and specifically, due to their excellent emulsifying properties, $NPEO_n$ are tremendously consumed in pesticide emulsions (with biodiesel as an oil phase) and metal machining liquid (with petroleum hydrocarbons as an oil phase). However, due to poor biodegradability and high environmental toxicity of $NPEO_n$, European Union REACH limited a use concentration of $NPEO_n$ in textile processing ten years ago. In 2011, Ministry of Environmental Protection of the P. R. China added nonyl phenol to *List of Toxic Chemicals Severely Restricted from Import and Export in China*.

Thus, there is an urgent need to find out a surfactant with structure and properties similar to those of nonylphenol ethoxylates but friendly to the environment. Researchers have been working hard at screening, and products selected in industrial circles, including polyoxyethylene fatty acid, fatty alcohol ethoxylates (including AEO and secondary alcohol ethyxylate SAE), alkyl polyglucoside (APG), fatty acid methyl ester ethoxylate (FMEE) and surfactants of Tween series and Span series, can hardly acquire properties similar to those of nonylphenol ethoxylates.

Toxicity of nonylphenol ethoxylates mainly come from a degradation product, alkylphenol. Hence if we change the phenol group with a cycloalkyl group to replace $APEO_n$ with alkylcyclohexanol polyoxyethylene ether ($NCEO_n$), then, because $NCEO_n$ will not be degraded to the toxic alkylphenol in the environment, and cycloalkanes has a degradation speed higher than that of aromatic hydrocarbon in the environment, so theoretically, $NCEO_n$ shall have a degradation speed higher than that of TX-10. Therefore, structurally, $NCEO_n$ have the prospect of becoming green substitutes of TX-10 in some application fields.

An alkylcyclohexanol polyoxyethylene ether surfactant can be synthesized by means of methods as follows: hydrogenation of nonylphenol ethoxylates; or ethylene oxide adduction of alkyl cyclohexanol. The first method needs to use a carcinogenic dioxane as a solvent. The second method can avoid using dioxane, but the alkyl cyclohexanol as a secondary alcohol has a quite low ethylene oxide adducting efficiency, which causes a low reaction conversion rate (about 50%) when the alkylcyclohexanol polyoxyethylene ether surfactant is prepared. Moreover, products with a high adducting number can hardly be separated from unreacted substances due to their high boiling points and multiple components. Therefore, we can use alkylcyclohexanol polyoxyethylene ether ($NCEO_{1-3}$, purchased from Jiangsu Lingfei Technology Co. LTD.) with an adduct number of 1-3 as raw materials to perform ethylene oxide adducting on primary alcohol, thereby achieving the synthesis.

The application properties of the ethoxylate surfactant greatly depend on the structure of the hydrophobic group of the ethoxylate surfactant and the ethylene oxide adduct number of the hydrophilic group, but no existing formulas or rules could be used. At present, there is no report of any synthesized $NCEO_n$ products with surface activity, so people cannot know the correspondence of ethylene oxide adduct number and properties of $NCEO_n$ and certainly cannot understand the feasibility of substituting $NCEO_n$ for $NPEO_{10}$.

SUMMARY

The disclosure discloses a preparation method of a surfactant with structure and properties similar to those of nonylphenol ethoxylates but friendly to the environment, namely a preparation method of an alkylcyclohexanol polyoxyethylene ether emulsifier.

The disclosure discloses the preparation method of the alkylcyclohexanol polyoxyethylene ether emulsifier to obtain a surfactant with structure and properties similar to those of nonylphenol ethoxylates but friendly to the environment. The structure of the alkylcyclohexanol polyoxyethylene ether emulsifier is shown in Formula I as follows:

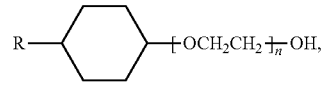

Formula I in Formula I, a carbon chain R is a straight-chain or branched alkyl group having a carbon number of $C_6$-$C_{15}$, and n is 5-17.

In the method, an ethoxylation reaction of alkylcyclohexanol polyoxyethylene ether ($NCEO_{1-3}$) with an adduct number of 1-3 is catalyzed by a basic catalyst, and the alkylcyclohexanol polyoxyethylene ether ($NCEO_{1-3}$) with the adduct number of 1-3 have a structural formula shown in Formula II as follows:

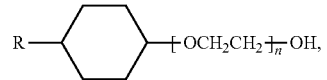

Formula II in Formula II, a carbon chain R is a straight-chain or branched alkyl group having a carbon number of $C_6$-$C_{15}$, and n is 1-3.

A molar ratio of raw materials $NCEO_{1-3}$ to ethylene oxide is $n(NCEO_{1-3}):n(CH_2CH_2O)=1:(4-14)$, and an equation is shown as follows:

Formula III

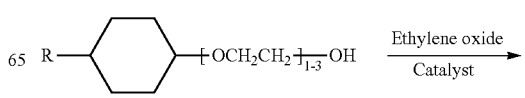

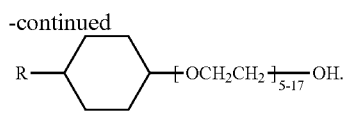

Specifically, a mass of the catalyst used accounts for 0.1-1.0% of a total mass of the reaction raw materials $NCEO_{1-3}$.

Specifically, the method includes the following steps: mixing the alkylcyclohexanol polyoxyethylene ether with an ethylene oxide adduct number of 1-3 ($NCEO_{1-3}$) with water and the catalyst to prepare a catalyst suspension; then placing the alkylcyclohexanol polyoxyethylene ether with the $NCEO_{1-3}$ and the catalyst suspension into the reactor, stirring and heating to a reaction temperature (90-140° C.), followed by dehydrating at vacuum until a water content is lower than 0.1% in the reaction mixture. Then, keep the pressure in the reactor at 0.1-0.5 Mpa when slowly adding ethylene oxide into the reactor, stirring for another 0.5-1 h at a constant reaction temperature until the pressure in the reactor does not drop, and then ending the reaction. After the temperature of the reaction mixture is cooled to room temperature, neutralizing the reaction mixture by acetic acid to pH 6.5-7 and then discharging.

More specifically, the catalyst is a strong alkaline catalyst.

More specifically, the catalyst consists one or two of the alkalis: $KOH$, $NaOH$, $LiOH$, $K_2CO_3$, $Na_2CO_3$, $CH_3OK$ or $CH_3ONa$.

More specifically, the catalyst suspension is a mixture of one or two of the alkalis from $KOH$, $NaOH$, $LiOH$, $K_2CO_3$, $Na_2CO_3$, $CH_3OK$ or $CH_3ONa$, a solvent and small amount of $NCEO_{1-3}$. A preparation method of the catalyst suspension includes the following steps: dissolving the alkaline catalyst in the solvent at room temperature to make the final concentration of the catalyst in the catalyst suspension reach 15-25 wt %; and then adding $NCEO_{1-3}$ (20-50 wt % of the catalyst) to the catalyst suspension, and intensely stirring the catalyst suspension to evenly disperse the $NCEO_{1-3}$. When the catalyst is one or two of $KOH$, $NaOH$, $LiOH$, $K_2CO_3$ and $Na_2CO_3$, the solvent is water; and when the catalyst is one or two of $CH_3OK$ and $CH_3ONa$, the solvent is 70% of ethanol aqueous solution.

The nonionic surfactant nonylphenol ethoxylate (10) is commonly known as $NPEO_{10}$, TX-10 or NP-10. As a hugely consumed nonionic surfactant, $NPEO_{10}$ is largely applied in agricultural emulsions, mechanical machining emulsions and textile processing emulsions, which causes the need of finding out a substitute with similar properties but containing no phenol structures. The disclosure provides the preparation and application of the alkylcyclohexanol polyoxyethylene ether emulsifier, the structure of the alkylcyclohexanol polyoxyethylene ether emulsifier is shown in Formula I and does not contain nonyl phenol; and when n is 5-17, the products all have good characteristics of the nonionic surfactant. Structures with required corresponding properties can be selected in accordance with actual needs, and $NPEO_n$ with similar properties and reproductive toxicity can be substituted for.

Taking nonylcyclohexanol ethoxylate (7) and nonylcyclohexanol ethoxylate (9), namely products $NCEO_7$ and $NCEO_9$ (NCEO with an ethylene oxide adduct number of 7 and 9, respectively) as examples, we found that the emulsifying properties of $NCEO_7$ and $NCEO_9$ for various typical oil phases are almost close to those of $NPEO_{10}$. $NCEO_7$ has an emulsifying ability even better than that of nonylphenol ethoxylate (10) for emulsions with liquid paraffin and olive oil as oil phases; and meanwhile, the cloud points of $NCEO_7$ and $NCEO_9$ are close to or higher than the cloud point of $NPEO_{10}$, and dissolution characteristics of $NCEO_7$ and $NCEO_9$ used in an aqueous solution are not affected, so that $NCEO_7$ and $NCEO_9$ can substitute for nonylphenol ethoxylate (10) to be used as an emulsifier.

The disclosure uses a strategy to adduct ethylene oxide to $NCEO_{1-3}$ through primary alcohol together with a strategy to pre-disperse the catalyst with small amount of $NCEO_{1-3}$, thereby effectively solved the mass transfer issue of the catalyst system by means of the effective catalyst suspension, and yielded low ethylene oxide and polyethylene glycol remaining in the products.

DETAILED DESCRIPTION

With the industrial commodities surfactant, nonylphenol ethoxylate $NPEO_n$ as the reference substances in the aspect of the surface activities, the $NCEO_n$ are synthesized and their emulsifying properties are detected, and the obtained alkylcyclohexanol polyoxyethylene ether surfactants provide a structure and application basis of an emulsifier.

The content of free polyethylene glycol in the products is detected according to the Weibull method (refer to the China national standard, GB 5560-2003). During the vacuum dehyration, the water content of a reaction mixture is measured according to the Karl Fischer assay (refer to the China national standard, GB/T 7380). The remained ethylene oxide in the products is detected with gas chromatography (refer to the China national standard, GB/T 16886.7-2001).

Measurement of emulsifying ability: Deemulsification time is used to indicate the emulsifying ability. Longer time represents better emulsifying ability. Liquid paraffin, biodiesel, xylene, olive oil or dimethyl silicone oil was used as oil phase substance, respectively. 40 mL of 1 g/L surfactant solution and 40 mL of the oil phase substance are placed in the mixing glass cylinder with a stopper. Firmly plug the mixing cylinder with the stopper, shaking vertically for five times followed by 1 min of standing, and then shaking vertically another five followed by 1 min of standing, keep the same strength for each shaking; which is repeatedly executed five times. After the fifth shaking ends, instantly started the timing, and the time for 10 mL of the water phase was separated to the lower layer is referred as the deemulsification time.

Measurement of cloud point: The cloud point assay refers to the China national standard of GB/T 5559-2010. A test tube containing 0.5% surfactant aqueous solution is placed into a water bath to be slowly heated (or cooled), a temperature corresponding to the time when the solution just becomes turbid (the heating assay) or turns into clear from completely turbid (the cooling assay) is referred to as a cloud point of a test sample. The cloud point of $NPEO_{10}$ is 61.1° C.

SYNTHESIS AND APPLICATION OF NONYLCYCLOHEXANOL ETHOXYLATES ARE TAKEN AS EXAMPLES AS FOLLOWS

Example 1 Preparation of Nonylcyclohexanol Ethoxylate (7) Under Catalysis of KOH Catalyst Suspension 5 g of KOH was dissolved in 15 mL of water at room temperature, and then 2 g of nonylcyclohexanol ethoxylate (1) was added to the solution and intensely stirred to be evenly dispersed to obtain the KOH catalyst suspension.

Figure 1:
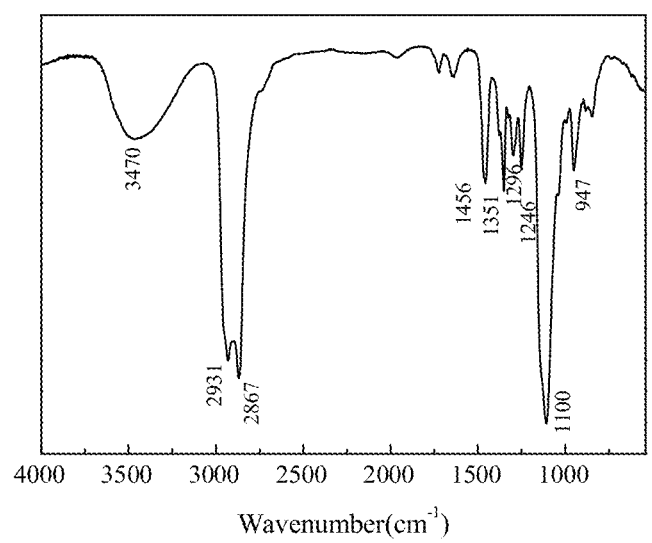
FIG. 1 is an FTIR spectrogram (IR) of nonylcyclohexanol ethoxylate (7) ($NCEO_7$).
Figure 2:
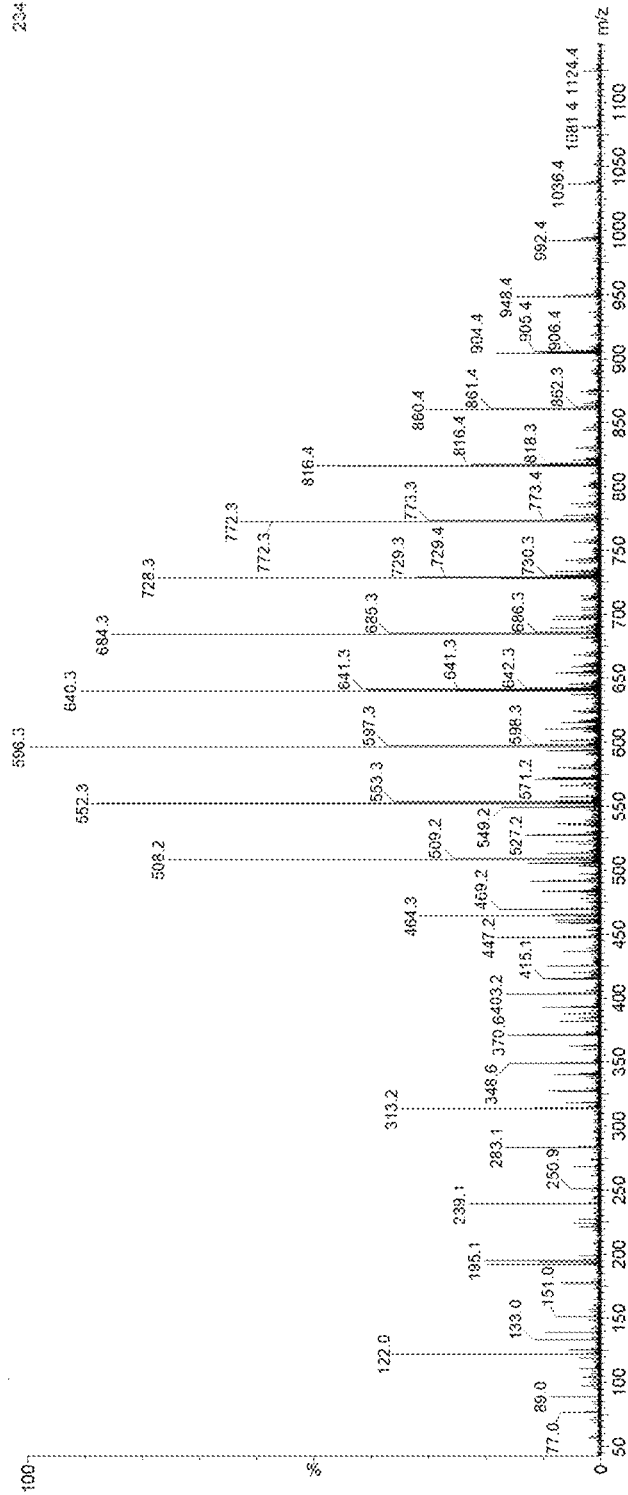
FIG. 2 is a mass spectrogram (ESI-MS) of nonylcyclohexanol ethoxylate (7) ($NCEO_7$).
Figure 3:
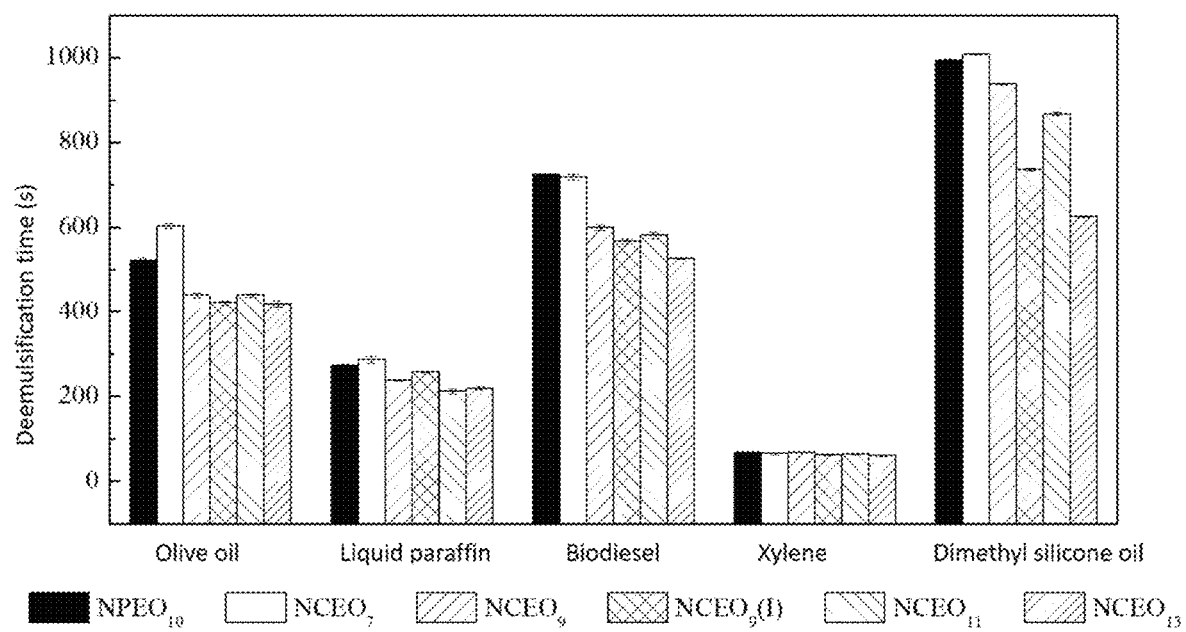
FIG. 3 shows emulsifying properties of nonylcyclohexanol ethoxylates $NCEO_n$ (n=7, 9, 11 and 13) (reference substance: nonylphenol ethoxylate $NPEO_{10}$).

1 kg of nonylcyclohexanol ethoxylate (1) was placed into the reactor, and the KOH catalyst suspension was added under stirring. The reaction mixture was heated to 90° C. and dehydrated in vacuum for 0.2 h. Then a system pressure was kept at 0.3 Mpa when 0.98 kg of ethylene oxide (a molar ratio of $NCEO_1:EO=1:6$) was slowly added into the reactor, stirring for another 0.5 h at 120° C. until the reaction pressure in the reactor does not drop. Keep stirring until the reaction mixture was cooled to the room temperature. The reaction mixture was then neutralized by acetic acid to a pH7 and was then discharged. The product nonylcyclohexanol ethoxylate (7) possess a cloud point of 62.5° C., a polyethylene glycol content of 1.1% and an ethylene oxide residual of 7 ppm. The FTIR spectrogram is shown in FIG. 1, the mass spectrogram is shown in FIG. 2, and the emulsifying properties are shown in FIG. 3.

Example 2 Preparation of Nonylcyclohexanol Ethoxylate (9) Under Catalysis of KOH Catalyst Suspension 6 g of KOH was dissolved in 15 mL of water at the room temperature, and then 3 g of nonylcyclohexanol ethoxylate (1) was added to the solution and intensely stirred to be evenly dispersed to obtain the KOH catalyst suspension.

1 kg of nonylcyclohexanol ethoxylate (1) was placed into a reactor, and the KOH catalyst suspension was added into the reactor under stirring. The reaction mixture was then heated to 100° C. and dehydrated in vacuum for 0.2 h. Then the reaction pressure was kept at 0.3 Mpa. 1.3 kg of ethylene oxide (a molar ratio of $NCEO_1:EO=1:8$) was slowly added into the reactor. Stirring for another 0.5 h at 125° C. until the reaction pressure in the reactor does not drop. Keep stirring until the reaction mixture was cooled to the room temperature. The reaction mixture was then neutralized by acetic acid to pH 6.5 and was then discharged. The product nonylcyclohexanol ethoxylate (9) possess a cloud point of 69.4° C., a polyethylene glycol content of 0.98% and an ethylene oxide residual of 7.2 ppm. The emulsifying properties of the product (recorded as $NCEO_9$) are shown in FIG. 3 of the specification.

Comparative Example Preparation of Nonylcyclohexanol Ethoxylate (9) Under Catalysis of KOH Powder 1 kg of nonylcyclohexanol ethoxylate (1) was placed into a reactor, and 6 g of KOH was added into the reactor under stirring. The reaction mixture was then heated to 100° C. and dehydrated in vacuum for 0.1 h. Then the reaction pressure was kept at 0.3 Mpa. 1.3 kg of ethylene oxide was slowly added into the reactor, stirring for another 0.5 h at 125° C. until the reaction pressure in the reactor does not drop. Keep stirring until the reaction mixture was cooled to the room temperature. The reaction mixture was then neutralized by acetic acid to pH 6.5 and was then discharged. The product nonylcyclohexanol ethoxylate (9) possess a cloud point of 72° C., a polyethylene glycol content of 16% and an ethylene oxide residual of 120 ppm. The emulsifying properties of the product (recorded as $NCEO_9(I)$) are shown in FIG. 3 of the specification.

Comparative Example Preparation of Nonylcyclohexanol Ethoxylate (9) Under Catalysis of KOH Aqueous Solution 6 g of KOH was dissolved in 15 mL of water at room temperature to be stirred to obtain the KOH catalyst aqueous solution.

1 kg of nonylcyclohexanol ethoxylate (1) was placed into a reactor, and the KOH catalyst aqueous solution was added into the reactor under stirring. The reaction mixture was then heated to 100° C. and dehydrated in vacuum for 0.1 h. Then the reaction pressure was kept at 0.3 Mpa. 1.3 kg of ethylene oxide was slowly added into the reactor, stirring for another 0.5 h at 125° C. until the reaction pressure in the reactor does not drop. Keep stirring until the reaction mixture was cooled to the room temperature. The reaction mixture was then neutralized by acetic acid to pH 6.5 and was then discharged. The product nonylcyclohexanol ethoxylate (9) possess a cloud point of 75° C., a polyethylene glycol content of 20% and an ethylene oxide residual of 7.0 ppm.

Example 3 Preparation of Nonylcyclohexanol Ethoxylate (13) Under Catalysis of $CH_3OK$ Suspension 6 g of $CH_3OK$ was dissolved in 15 mL of 70% ethanol aqueous solution at the room temperature, and then 1 g of nonylcyclohexanol ethoxylate (3) was added to the solution and intensely stirred to be evenly dispersed to obtain the $CH_3OK$ catalyst suspension.

1 kg of nonylcyclohexanol ethoxylate (3) was placed into a reactor, and the $CH_3OK$ catalyst suspension was added into the reactor under stirring. The reaction mixture was then heated to 140° C. and dehydrated in vacuum for 0.2 h. Then the reaction pressure was kept at 0.4 Mpa. 1.23 kg of ethylene oxide (a molar ratio of $NCEO_3:EO=1:10$) was slowly added into the reactor. Stirring for another 1 h at 140° C. until the reaction pressure in the reactor does not drop. Keep stirring until the reaction mixture was cooled to the room temperature. The reaction mixture was then neutralized by acetic acid to pH 6.5 and was then discharged. The product nonylcyclohexanol ethoxylate (13) possess a cloud point of 83.9° C., a polyethylene glycol content of 2.1% and an ethylene oxide residual of 6.3 ppm. The emulsifying properties of the product (recorded as $NCEO_{13}$) are shown in FIG. 3 of the specification.

Example 4 Preparation of Nonylcyclohexanol Ethoxylate (7) Under Catalysis of $CH_3OK$ Suspension 4 g of $CH_3OK$ was dissolved in 12 mL of 70% ethanol aqueous solution at the room temperature, and then 1 g of nonylcyclohexanol ethoxylate (2) was added to the solution and intensely stirred to be evenly dispersed to obtain the $CH_3OK$ catalyst suspension.

1 kg of nonylcyclohexanol ethoxylate (2) was placed into a reactor, and a $CH_3OK$ catalyst suspension was added into the reactor under stirring. The reaction mixture was then heated to 90° C. and dehydrated in vacuum for 0.2 h. Then the reaction pressure was kept at 0.3 Mpa. 0.70 kg of ethylene oxide was slowly added into the reactor. Stirring for another 1 h at 120° C. until the reaction pressure in the reactor does not drop. Keep stirring until the reaction mixture was cooled to the room temperature. The reaction mixture was then neutralized by acetic acid to pH7 and was then discharged. The product nonylcyclohexanol ethoxylate (7) possess a cloud point of 63.5° C., a polyethylene glycol content of 2.6% and an ethylene oxide residual of 2.3 ppm.

Example 5 Preparation of Nonylcyclohexanol Ethoxylate (7) Under Catalysis of $NaHCO_3$ Suspension 5 g of $NaHCO_3$ was dissolved in 15 mL of water at the room temperature, and then 2 g of nonylcyclohexanol ethoxylate (2) was added to the solution and intensely stirred to be evenly dispersed to obtain the $NaHCO_3$ catalyst suspension.

1 kg of nonylcyclohexanol ethoxylate (2) was placed into a reactor, and the $NaHCO_3$ catalyst suspension was added into the reactor under stirring. The reaction mixture was then heated to 90° C. and dehydrated in vacuum for 0.2 h. Then the reaction pressure was kept at 0.3 Mpa when 0.70 kg of ethylene oxide was slowly added into the reactor. Stirring for another 0.5 h at 120° C. until the reaction pressure in the reactor does not drop. Keep stirring until the reaction mixture was cooled to the room temperature. The reaction mixture was then neutralized by acetic acid to pH7 and was then discharged. The product nonylcyclohexanol ethoxylate (7) possess a cloud point of 69° C., a polyethylene glycol content of 28.2% and an ethylene oxide residual of 26 ppm.

Under the above same reaction conditions, nonylcyclohexanol ethoxylates (7) are prepared under catalysis of $Na_2CO_3$ and NaOH correspondingly; and the obtained products nonylcyclohexanol ethoxylates (7) have cloud points of 63° C. and 62.6° C., polyethylene glycol contents of 1.2% and 1.0% and ethylene oxide residual quantities of 8 ppm and 5 ppm correspondingly.

Under the same reaction conditions, $NaHCO_3$ cannot effectively catalyze the reaction, and by-products polyethylene glycol and residual ethylene oxide are relatively high in content, which may be a cause of weak alkalinity of $NaHCO_3$ or may need to increase the consumption of weak base. However, it can be seen in Example 5 that nevertheless, due to the adoption of the suspension for catalysis, residual ethylene oxide in the product still has a catalysis effect better than that of base powder of Comparative example in Example 2.

In the following Comparative example, reaction was repeated after the increase of a $NaHCO_3$ consumption, reaction temperature and ageing time.

Comparative Example Preparation of Nonylcyclohexanol Ethoxylate (7) Under Catalysis of $NaHCO_3$ Suspension after Increase of $NaHCO_3$ Consumption, Reaction Temperature and Ageing Time on Basis of Example 5

10 g of $NaHCO_3$ was dissolved in 30 mL of water at the room temperature, and then 4 g of nonylcyclohexanol ethoxylate (2) was added to the solution and intensely stirred to be evenly dispersed to obtain the $NaHCO_3$ catalyst suspension.

1 kg of nonylcyclohexanol ethoxylate (2) was placed into a reactor, and the $NaHCO_3$ catalyst suspension was added into the reactor under stirring. The reaction mixture was then heated to 130° C. and dehydrated in vacuum for 1 h. Then the reaction pressure was kept at 0.5 Mpa when 0.70 kg of ethylene oxide was slowly added into the reactor. Stirring for another 2 h at 130° C. until the reaction pressure in the reactor does not drop. Keep stirring until the reaction mixture was cooled to the room temperature. The reaction mixture was then neutralized by acetic acid to pH7 and was then discharged. The product nonylcyclohexanol ethoxylate (7) has a cloud point of 73.1° C., a polyethylene glycol content of 25.2% and an ethylene oxide residual of 20 ppm.

It can be seen that even after the increase of the $NaHCO_3$ consumption, reaction temperature and ageing time, the $NaHCO_3$ suspension still cannot perform catalysis well to prepare the nonylcyclohexanol ethoxylate. Thus, it is not the problem of $NaHCO_3$ consumption, and the cause remains to be studied.

Example 6 Preparation of Emulsions from Nonylcyclohexanol Ethoxylate Surfactant and Several Typical Oil Products With liquid paraffin, biodiesel, xylene, olive oil and dimethyl silicone oil as oil phase substance, respectively, and a 0.1% nonylcyclohexanol ethoxylate surfactant as an emulsifier, emulsifying abilities, namely stability properties of the obtained emulsions, are shown in FIG. 3 of the specification.

FIG. 3 shows that emulsifying abilities of nonylcyclohexanol ethoxylates (7) and (9) for several typical oils are close to the emulsifying ability of $NPEO_{10}$. Specifically, the emulsifying ability of $NCEO_7$ for mineral oil or vegetable oil is higher than that of $NPEO_{10}$, the emulsifying ability of $NCEO_7$ for biodiesel is consistent with the emulsifying ability of $NPEO_{10}$. Therefore, $NCEO_7$ and $NCEO_9$ can be used for substituting for $NPEO_{10}$ as an emulsifier for these oil emulsions.

What is claimed is:

1. A method of preparing an alkylcyclohexanol polyoxyethylene ether (NCEO) emulsifier, wherein the NCEO emulsifier has a structure shown in Formula I as follows:

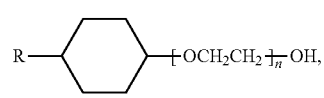

Formula I,
wherein R is a straight-chain or branched alkyl group having a carbon number of $C_6$-$C_{15}$, and
wherein n is 5 to 17;
which comprises:
conducting an ethoxylation reaction by:
(a) preparing a catalyst suspension by:
dissolving KOH as a basic catalyst in water as a solvent at room temperature,
adding a first amount of NCEO with an adduct number of 1 to 3 ($NCEO_{1-3}$) in an amount of 20 wt % to 50 wt % of the basic catalyst of the catalyst suspension, wherein the final mass concentration of the basic catalyst is 15 wt % to 25 wt % of the catalyst suspension, and
stirring the catalyst suspension with sufficient intensity to evenly disperse the first amount of $NCEO_{1-3}$ in the catalyst suspension, wherein:

the $NCEO_{1-3}$ has a structural formula shown in Formula II as follows:

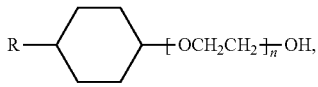

Formula II,

R is a straight-chain or branched alkyl group having a carbon number of $C_6$-$C_{15}$, n is 1 to 3, and the catalyst suspension optionally further comprises at least one of $LiOH$, $K_2CO_3$, or $Na_2CO_3$:

(b) placing the catalyst suspension into a reactor, (c) adding a second amount of $NCEO_{1-3}$ into the reactor with the catalyst suspension, wherein a dry mass of the basic catalyst is 0.1% to 1.0% of a total mass of the $NCEO_{1-3}$ in the ethoxylation reaction, (d) stirring and heating the reactor to a reaction temperature of 90° C. to 140° C., (e) dehydrating the reactor in a vacuum until a water content in the reactor is lower than 0.1%;

(f) adding ethylene oxide (EO) to the reactor at a molar ratio of $NCEO_{1-3}$:

EO of 1:8 while maintaining a system pressure at 0.1 to 0.5 Mpa in the reactor, and maintaining constant reaction temperature, (g) stirring the reactor for 0.5 hour to 1 hour after the pressure in the reactor does not drop any more, (h) cooling the reactor to room temperature, (i) neutralizing the reaction mixture in the reactor by addition of acetic acid to pH 6.5 to 7, and (j) discharging the reactor thereby producing NCEO emulsifier.

2. The method of claim 1, wherein the catalyst suspension is a disperse system comprising the $NCEO_{1-3}$ and the basic catalyst.

3. The method of claim 1, wherein the catalyst suspension further comprises one or more of $LiOH$, $K_2CO_3$, and $Na_2CO_3$.

4. The method of claim 1, wherein adding ethylene oxide (EO) to the reactor is performed at 120° C. to 125° C.

5. The method of claim 1, wherein the NCEO produced comprises a polyethylene glycol content of 1.1% or less and an ethylene oxide residual of 7.2 ppm or less.

6. The method of claim 1, wherein the method further comprises adding the NCEO emulsifier to an oil phase to prepare an emulsion.

7. The method of claim 6, wherein the oil phase comprises one or more of liquid paraffin, biodiesel, xylene, olive oil, and dimethyl silicone oil.

8. The method of claim 6, wherein the NCEO emulsifier is added in an amount of 0.1% to the oil phase.

9. The method of claim 6, wherein the emulsion comprises no nonyl phenol.

* * * * *